350-96.11 SR

XR 3,864,130

Nassenstein et al.

[11] 3,864,130

[45] Feb. 4, 1975

[54] INTEGRATED O.

[75] Inventors: Heinrich Nassenstein, Leverkusen; Jurgen Geldmacher, Leichlin, both of Germany

[73] Assignee: Bayer Aktiengesellschaft, Leverkusen, Germany

[22] Filed: Nov. 19, 1973

[21] Appl. No.: 416,918

Related U.S. Application Data

[63] Continuation of Ser. No. 229,802, Feb. 28, 1972, abandoned.

[30] Foreign Application Priority Data

Mar. 2, 1971 Germany .......................... 2109687

[52] U.S. Cl. ................. 96/38.3, 96/27 E, 96/27 H, 96/27 R

[51] Int. Cl. ........................................ G03c 5/00

[58] Field of Search ....... 96/38.3, 27 H, 27 E, 27 R, 96/35, 35.1

...s Cited

UNITED STATES PATENTS

| | | | |
|---|---|---|---|
| 3,617,274 | 11/1971 | Lin | 96/27 H |
| 3,635,540 | 1/1972 | Nassenstein | 96/27 H |
| 3,672,744 | 6/1972 | Strope et al. | 96/27 H |
| 3,689,264 | 9/1972 | Chandross et al. | 96/27 H |
| 3,695,879 | 10/1972 | Laming et al. | 96/38.3 |

*Primary Examiner*—David Klein
*Assistant Examiner*—Edward C. Kimlin
*Attorney, Agent, or Firm*—Burgess, Dinklage & Sprung

[57] ABSTRACT

In a process for the production of integrated optical circuits in particular waveguides, radiation-sensitive material is exposed to electromagnetic surface waves. The refractive index of the exposed layer may be changed by physical or chemical processing which is carried out either during or after exposure. Preferably the surface waves are produced by total reflection.

14 Claims, 4 Drawing Figures

Figure 1:
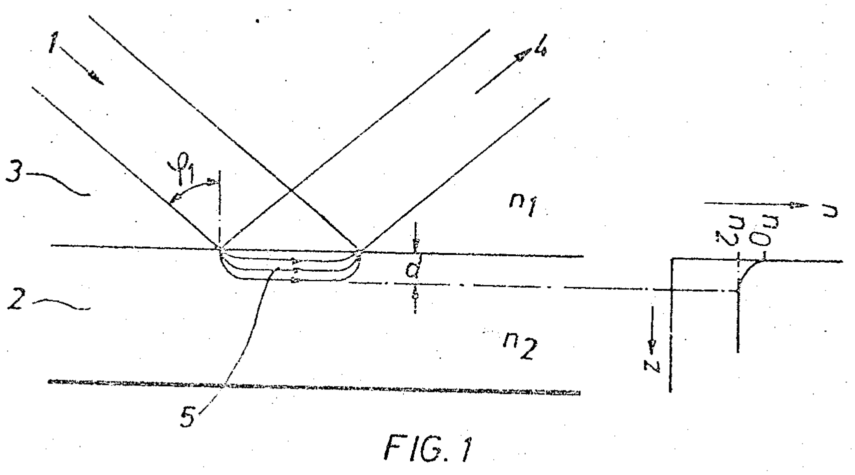

3864130
OR IN 96/38.3

PATENTED FEB 4 1975 3,864,130

INTEGRATED OPTICAL CIRCUITS

This is a continuation of application Ser. No. 229,802, filed Feb. 28, 1972, now abandoned.

This invention relates to a process for the production of integrated optical elements, in particular optical waveguides. In the context of the invention, optical elements are the components known from microwave technology, for example waveguides (hollow waveguides), couplers, hybrids and resonators. The production of such components for optical frequencies has recently attracted very considerable interest in respect of modern communications technology and optical data processing.

It is known from the theory of the propagation of electromagnetic waves in dielectric waveguides that these waveguides should have very small dimensions. In the case of rectangular waveguides in particular, one dimension must be in the order of magnitude of the wavelength of the electromagnetic radiation which is to be propagated in this waveguide. Accordingly, to produce optical elements for the frequency range of visible light, it is advisable to adopt methods which lead to thin layers of extremely high optical quality. The crucial physical parameter in this connection is the damping effect of the waveguide. It is determined by the homogeneity of its optical (absorption and dispersion) and geometric (roughness of the interfaces) properties.

Processes for the production of dielectric waveguides of this kind are known in which suitable materials are exposed to high-energy electromagnetic waves, for example visible or ultraviolet light. In order to obtain the dimensions required for optical waveguides, the material must be present in the form of a suitably thin layer which often represents difficulties. In addition, the two interfaces of this layer must be of extremely high optical quality, as mentioned above.

According to the present invention, there is provided a process for the production of integrated optical elements, for example waveguides, wherein a layer of a radiation-sensitive material adjoining a surface is exposed to one or more electromagnetic surface waves. It has been found that optical elements, in particular dielectric waveguides, can readily be produced by the above process. The expression "surface waves" is defined as follows:

Homogeneous electromagnetic waves of frequency $\gamma$ can only exist in isotropic, non-absorbing medium of refractive index $n$ with wave lengths $\lambda_h \geqq \lambda_n = c_n/\gamma$ ($c_n$ = speed of light in the medium in question). A wave with the same frequency $\gamma$ but with a wave length $\lambda_s < \lambda_n$ and a corresponding phase velocity $c_s < c_n$ is normally unable to exist in the medium. However, waves such as these can be superimposed upon the medium under certain peripheral conditions at an interface of the kind which occur for example in the event of total reflection. Since the amplitude of these waves very quickly diminishes with increasing distance from the interface from which the wave is induced, they are referred to as "surface waves."

There are a number of dielectric materials which directly change their refractive index (photochromic and photopolymeric materials) when exposed sufficiently to electromagnetic waves. In another group of materials, there is initially no change in the refractive index of the exposed layer. It is only simultaneous or subsequent photochemical or photophysical processing of the exposed layer which leads to the change.

According to another aspect of the invention, therefore, the refractive index of the exposed layer is changed by photochemical or photophysical processing carried out either during or after exposure. In either case, the change in refractive index only extends over that area of the layer which corresponds to the depth of penetration of the surface waves. The depth of penetration can be varied by varying the peripheral conditions. Another advantage of the process according to the invention is that only one of the interfaces of the material need be of high quality. The second interface of the waveguide is of course now produced by the effect of the surface wave and corresponds in its quality to the uniformity thereof. However, it must be remembered that it is not a sharp interface between two materials of different refractive index which is involved here, but a very thin but finite transition layer in which there is a refractive index gradient. The thickness of the transition layer can be varied in dependence upon the choice of the wave length and also by the schematic or physical processing carried out either during or after exposure.

The surface waves are advantageously generated by means of total reflection. For this purpose, the dielectric material is brought into contact with an optically more dense medium. If now a plane wave in the more dense medium is allowed to impinge upon the interface at an angle which is greater than the critical angle of total reflection, the light wave appears in the dielectric radiation-sensitive material in the form of a surface wave with a very limited depth of penetration. In this case, the depth of penetration can be varied very easily by varying the angle of incidence. A detailed description of the physical properties of the surface waves can be found in the article by H. Nassenstein, Naturwissenschaften, 57, pages 468 – 473, 1970. Reference is made in particular to FIGS. 5 and 8 of this article in which the blackening of a thin layer of a photographic material produced by surface waves is immediately visible. If a layer of this kind is bleached, the blackening structure is converted into a phase structure. Accordingly, a thin layer with a changed refractive index is obtained.

Accordingly, another aspect of the process according to the invention provides for the use of a normal photographic silver halide layer in which a phase structure is generated in known manner as the radiation-sensitive dielectric material.

Other radiation-sensitive materials suitable for use in the process according to the invention include photopolymers, photoresists, photochromes and chromate gelatins. On account of the relatively low sensitivity of these materials, it is necessary to use light sources of high intensity (for example Ar-lasers, Kr-lasers, or even $CO_2$-lasers for heat-initiated effects).

In one particular embodiment of the invention, a homogeneous wave is superimposed upon the surface wave in a component-section of the radiation-sensitive material so that an interference structure is formed in this component-section. The phase structure produced in this way is suitable as a coupler for coupling an electromagnetic wave into an optical waveguide. Alternatively, a second surface wave is superimposed upon the first surface wave in a component-section of the radiation-sensitive material so that an interference structure attributable to the interference of surface waves is formed in this component-section. Once again, an optical element suitable for use as a coupler is obtained.

Figure 2:
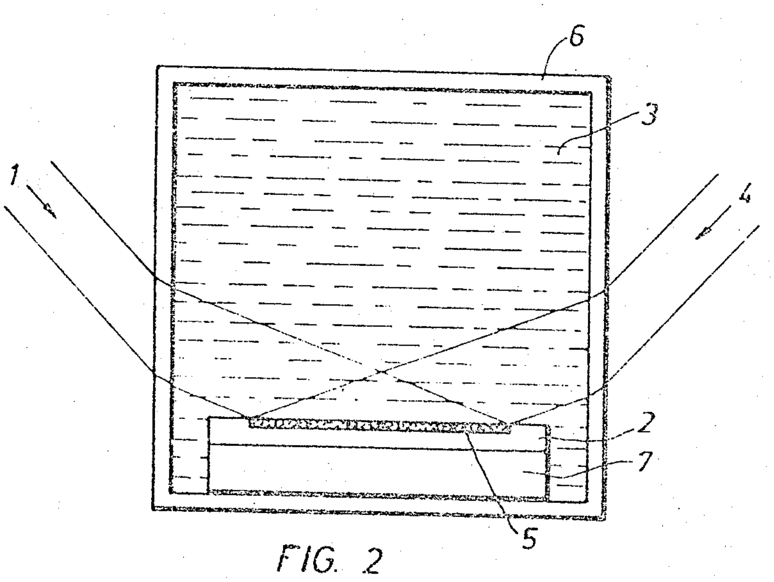
Figure 3:
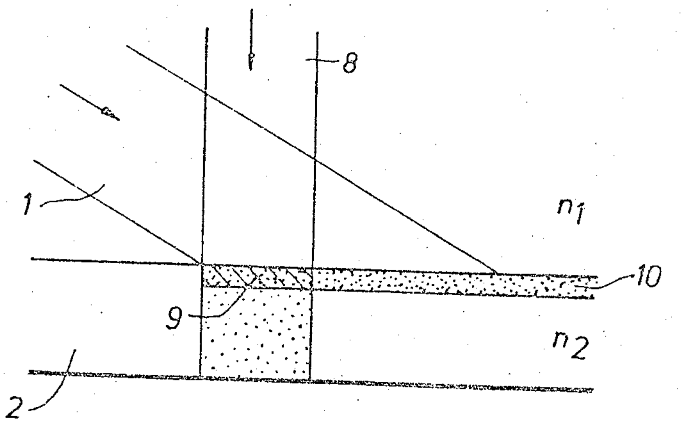
Figure 4:
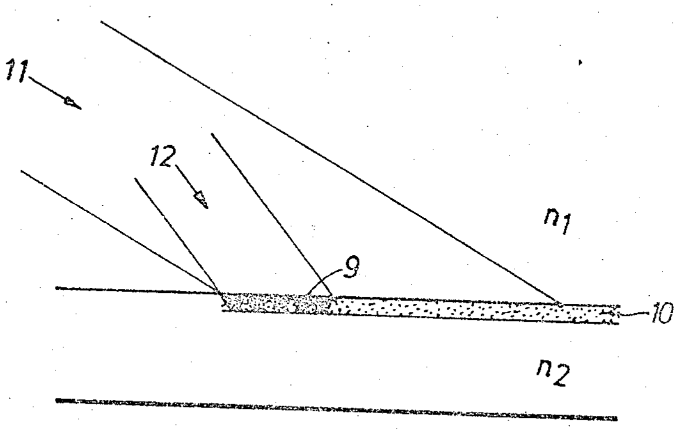

Referring to the accompanying drawings:

FIG. 1 diagrammatically illustrates the surface wave under conditions of total reflection, FIG. 2 shows an optical arrangement for exposing a material to surface waves, and FIGS. 3 and 4 are examples illustrating the production of optical couplers.

In FIG. 1, a flat monochromatic wave 1 coming from the left impinges on the interface of an optically relatively thin radiation-sensitive medium 2 of refractive index $n_2$ with an optically more dense medium 3 of refractive index $n_1$. If the angle of incidence $\rho_1$ of the wave 1 is greater than the critical angle $\rho_{gr}$ for total reflection, total reflection occurs at the interface between the two media (totally reflected wave 4). A surface wave 5 then appears in the thinner medium, its amplitude quickly diminishing with increasing distance Z from the interface. Its depth of penetration $d$ is generally in the order of magnitude of the wave lengths in the thinner medium. Exposure to the surface wave in the vicinity of the depth of penetration $d$ produces a change in the refractive index which is also diagrammatically illustrated in FIG. 1. At depths not penetrated, the refractive index remains at the original value $n_2$.

An optical arrangement for carrying out the process according to the invention is illustrated in FIG. 2. The radiation-sensitive material 2, which acts as a starting material for the optical elements, is accommodated on a support 7 in a cell 6. The cell 6 is completely filled with diiodomethane which has a very high refractive index ($n_1 = 1.74$ for $\lambda = 633$ nm) as contact liquid. The planar monochromatic wave 1 coming in through the cell wall from the left is totally reflected at the interface of the radiation-sensitive material 2 with the contact liquid 3. The exposure of the radiation-sensitive material to the surface wave 5 which occurs produces a layer with a changed refractive index which acts as dielectric thin-layer waveguide in the optical range. Since the transverse dimensions of this waveguide are not critical, corresponding masks have not been shown.

In addition to the wave 1, a coherent homogeneous wave 8 is directed vertically downwards, as shown in FIG. 3. The wave 8 penetrates into the medium 2 and interferes with the surface wave which results from total reflection of the wave 1. The resulting interference structure 9 only extends over the depth of penetration of the surface wave. Accordingly, a layer with a periodically varying refractive index is obtained in this component-section. A layer with a continuously changing refractive index is again produced in the adjoining zone 10 in which only the surface wave is present. Thus, the entire arrangement represents a grid coupler followed by an optical waveguide.

By suitably selecting the amplitudes of the two interference surface waves, the waveguide structure can also be made to extend to a greater depth in the layer than the interference structure.

Another arrangement for producing an optical grid coupler followed by a waveguide is shown in FIG. 4. In this case, two coherent planar monochromatic waves 11 and 12 impinge on the interface between the two media and are both totally reflected. The two associated surface waves then interfere in the radiation-sensitive medium and produce the interference structure 9. Only the surface wave 9 arising from the wave 11 is present in following zone 10, where it produces a refractive index gradient. Accordingly, the optical element as a whole again consists of a periodic phase structure, which corresponds to the interference structure 9 and which acts as a grid coupler, and a following waveguide.

If the two waves 11 and 12 are allowed to impinge from opposite sides rather than from the same side, an interference structure with a much higher local frequency is obtained. Although this generally has a different diffraction efficiency, it does have the advantage that no excessively high diffraction orders occur.

The following describes examples of radiation-sensitive materials suitable for use as starting material for the production of dielectric waveguides, and suitable treatments of them.

EXAMPLE 1

A highly sensitive fine-grained silver bromide iodide photographic layer (Scienta 8E75, a product of Agfa-Gevaert) was exposed to a surface wave in the arrangement shown in FIG. 2. An He—Ne-laser was used as the light source in this case. The exposed material was then subjected to the following photographic processing:

1. Pre-hardening of the emulsion in a special bath treatment lasting for 10 minutes, the bath comprising 10 g of $Na_2CO_3$, 50 g of $Na_2SO_4$, 40 cc of benzotriazole (0.5% alcoholic solution), made up with water to 1 litre, and 5 cc/l of formalin added just before use;
2. Rinsing for 2 minutes in water;
3. Developing for 5 minutes in Agfa-Gevaert's developer G3P5;
4. Fixing;
5. Rinsing;
6. Bleaching;
7. Rinsing for 5 minutes;
8. Successive bath treatments in 50%, 75% and 90% alcohol, each for 2 minutes; and
9. Drying in air.

The bleaching bath consisted of 2 components:

Bleaching bath A: 120 g of $CuSO_4$, 7.5 g of KBr and 150 g of citric acid in 1 litre of water;

Bleaching bath B: 1 part of $H_2O_2$ (30% solution) in 7 parts of water.

With a total exposure of less than 100 $\mu$W sec cm$^{-2}$, the exposed layers were bleached for 12 minutes in a 1:1 mixture of bleaching baths A and B. With a total exposure of more than 100 $\mu$W sec cm$^{-2}$, the exposed layers were treated for 6 minutes in bleaching bath A and for 6 minutes in a 1:1 mixture of A and B. This precaution proved to be necessary because, in the event of heavy exposure, parts of the emulsion were damaged by $H_2O_2$.

The physical effect of bleaching is that the absorption structure which consists of metallic silver is converted into a phase structure consisting of AgBr. The refractive index of the AgBr layer is considerably higher than the refractive index of the emulsion.

Layers with improved homogeneity are obtained when the photographic plates are treated before exposure in an atmosphere of water vapour. This greatly reduces any mechanical stresses present in the emulsion.

EXAMPLE 2

Photopolymers are also suitable for use as a starting material. Polyvinyl alcohol or copolymers thereof containing vinyl alcohol units in polymerised form, photosensitive cinnamic acid groups or acid groups being arranged inside chains, were used particularly successfully. Polymers of this kind are described in detail for example in German Pat. Specifications Nos. 1,099,732, 1,067,219, 1,063,802, or in U.S. Pat. Nos. 1,965,710, 1,973,493 and 2,063,348. Radiation-sensitive systems with acid groups are described in German Pat. Specifications Nos. 1,053,782, 1,079,949, 1,079,950 and 1,285,306.

EXAMPLE 3

A weakly hardened 20 $\mu$ thick clear gelatin layer arranged on a glass plate is sensitised by treatment for 5 minutes at room temperature with a 7% solution of ammonium dichromate, and then dried in darkness. The chromate gelatin layers thus produced are then exposed to a surface wave in accordance with FIG. 2. In this case, a crypton or argon laser has to be used as the light source. The exposed material is then treated in a steep-hardening bath in which it is simultaneously desensitised.

One suitable method of steep-hardening is described for example by L. H. Lynn, Applied Optics, Vol. 8, No. 5, pages 963 – 966.

What we claim is:

1. A process for the production of integrated optical elements, for example waveguides, comprising contacting a dielectric radiation sensitive material with a transparent optical medium having a higher refractive index than said radiation sensitive material and illuminating the boundary between the two materials through said transparent medium with electromagnetic radiation at an angle which is greater than the critical angle of total reflection, thereby creating in the radiation sensitive material adjacent the boundary an exponentially decaying surface wave and producing a transition layer having a refractive index gradient in accordance with the exponential decay, the maximum of the refractive index being at the boundary.

2. A process according to claim 1, wherein the refractive index gradient is produced by physical or chemical processing which is carried out either during or after exposure.

3. A process according to claim 1, wherein the surface waves are produced by total reflection.

4. A process according to claim 1, wherein a photopolymer is used as the radiation-sensitive material.

5. A process according to claim 1, wherein photochrome is used as the radiation-sensitive material.

6. A process according to claim 1, wherein chromate-gelatin is used as the radiation-sensitive material.

7. A process according to claim 1, wherein a homogeneous wave is superimposed upon the surface wave in a component section of the radiation-sensitive material so that an interference structure is formed in the component section.

8. A process according to claim 1, wherein a second surface wave is superimposed upon the first surface wave in a component section of the radiation-sensitive material so that an interference structure is formed in the component section.

9. A process according to claim 2, wherein the radiation sensitive material is a photographic silver halide emulsion in which a phase structure is produced, a photopolymer, a photochrome, or chromate-gelatin.

10. A process according to claim 3, wherein the radiation sensitive material is a photographic silver halide emulsion in which a phase structure is produced, a photopolymer, a photochrome, or chromate gelatin.

11. A process according to claim 7, wherein the radiation sensitive material is a photographic silver halide emulsion in which a phase structure is produced, a photopolymer, a photochrome, or chromate gelatin.

12. A process according to claim 8, wherein the radiation sensitive material is a photographic silver halide emulsion in which a phase sturcture is produced, a photopolymer, a photochrome, or chromate gelatin.

13. A process according to claim 1, wherein the radiation sensitive material is a photographic silver halide emulsion layer which is after exposure to the exponentially decaying surface wave converted into a phase structure.

14. A process according to claim 2, wherein the radiation sensitive material is a photographic silver halide emulsion layer which is after exposure to the exponentially decaying surface wave converted into a phase structure.

* * * * *